United States Patent
Siour et al.

(10) Patent No.: US 6,511,724 B1
(45) Date of Patent: Jan. 28, 2003

(54) PIPES FOR CONVEYING DRINKING WATER

(75) Inventors: Daniel Siour, Sartrouville (FR); Olivier Denizart, Millery (FR)

(73) Assignee: ATOFINA, Puteaux (FR)

( * ) Notice: Subject to any disclaimer, the term of this patent is extended or adjusted under 35 U.S.C. 154(b) by 1076 days.

(21) Appl. No.: 08/612,694

(22) Filed: Mar. 8, 1996

(30) Foreign Application Priority Data

Mar. 10, 1995 (FR) .............................. 95 02813

(51) Int. Cl.$^7$ ................................ F16L 11/04
(52) U.S. Cl. ................ 428/36.91; 428/421; 428/476.1; 428/476.9; 428/483; 428/516; 428/518; 138/140; 138/DIG. 7
(58) Field of Search .......................... 428/476.9, 36.91, 428/421, 476.1, 483, 516, 518; 138/140, DIG. 7

(56) References Cited

U.S. PATENT DOCUMENTS 3,561,493 A    2/1971   Maillard
4,905,735 A  * 3/1990   Akiyoshi ................. 138/126
5,076,329 A  * 12/1991  Brunnhofer ............... 138/137
5,242,976 A  * 9/1993   Strassel et al. .......... 525/72
5,472,754 A  * 12/1995  Douchet ................. 428/36.91

FOREIGN PATENT DOCUMENTS

FR         2 701 303       8/1994
WO         WO 93/21466    10/1993

* cited by examiner

*Primary Examiner*—Rena Dye
(74) *Attorney, Agent, or Firm*—Millen, White, Zelano & Branigan, P.C.

(57) ABSTRACT

The invention relates to pipes for conveying drinking water, including a main layer made of polyolefin covered on the outside with a layer of a thermoplastic polymer which is impervious to hydrocarbons, such as, for example, polyamides, polyvinylidene fluoride, ethyl/vinyl alcohol copolymers or polyesters. These pipes are particularly useful for pipes buried in soils that may be contaminated with hydrocarbons.

5 Claims, No Drawings

PIPES FOR CONVEYING DRINKING WATER

The present invention relates to pipes for conveying drinking water and more particularly polyolefin pipes. Mains for distributing drinking water, in particular buried mains are made of polyolefin pipes such as polyethylene or polypropylene. These pipes have many advantages. They do not corrode, they are delivered as coils of great length; it suffices to unroll them.

Polyethylene and polypropylene have no need of plasticizers; they are highly suitable for drinking water. However, some soils can be contaminated or risk being contaminated by essentially nonpolar hydrocarbons like toluene, benzene, fuel or motor spirit.

Since polyolefins are nonpolar materials, they are permeable to these contaminants, which migrate through the wall of the pipe and contaminate the water.

The applicants have now found new pipes for conveying drinking water, which are impervious or substantially impervious to hydrocarbons and to relatively nonpolar organic molecules containing oxygen, sulfur and/or nitrogen while retaining the advantages of the polyolefin pipes.

The present invention relates to pipes including a main layer made of polyolefin covered externally with a layer of a thermoplastic polymer which is impervious or substantially impervious to hydrocarbons and relatively nonpolar organic molecules. Hereinafter, the term "impervious" shall indicate "impervious or substantially impervious". The invention includes pipes for conveying drinking water, comprised of a plurality of layers, wherein a main layer comprising a polyolefin is covered externally with a second layer comprising a thermoplastic polymer which is impervious to hydrocarbons.

The polyolefin of the main layer may be chosen from polyethylene, polypropylene, copolymers of ethylene and of an alpha-olefin, copolymers of ethylene and of esters of unsaturated carboxylic acids, such as alkyl (meth)acrylates, copolymers of ethylene and of vinyl derivatives of saturated carboxylic acids such as vinyl acetate, or mixtures of these polymers.

Low density, high density or intermediate density polyethylene is advantageously employed. The polyethylene is usually filled with carbon black.

It would not constitute a departure from the scope of the invention if the polyolefin layer consisted of a number of layers, for example a layer of recycled polyolefin between two layers of virgin polyolefin.

The thickness of this polyolefin layer is a function of the mechanical stresses. To give an example, a thickness of 30 to 60 mm is suitable for external diameters up to 800 mm, while thicknesses of 2 to 6 mm are employed for external diameters of 20 mm (see, for example, NFT standard 54-063 for HDPE pipes).

The thermoplastic polymer which is impervious to hydrocarbons can be defined as a polymer which, in similar conditions and in the case of measurements performed on films of 100 $\mu$m thickness, is 15 to 100 times less permeable than polyethylene. Examples which may be mentioned are:

polyvinylidene fluoride (PVDF) homopolymer or copolymers of vinylidene fluoride ($VF_2$) which have sufficient $VF_2$ units for the layer to be impervious, copolymers of ethylene and vinyl alcohol (EVOH), polyesters such as polybutylene terephthalate (PBT) and polyethylene terephthalate (PET), polyamides, copolyamides, their mixtures with polyolefins, a mixture of one or more of the above with other polymers, provided that the layer is thermoplastic and impervious.

The pipes of the invention can be manufactured very simply by coextrusion of the polyolefin and of the impervious thermoplastic polymer. It is recommended to place a binder between the polyolefin of the main layer and the layer of impervious polymer.

In fact, impervious thermoplastic polymers are poorly compatible with polyolefins and, even in the course of coextrusion, where the two polymers are placed in contact near their melting points, the adhesion is bad. This bad adhesion can be troublesome when the pipe is cut to make junctions, couplings or side connections.

The pipes of the invention can therefore be in the following form, starting from the interior: poly-olefin/binder/impervious thermoplastic polymer.

It would not constitute a departure from the scope of the invention to cover the layer of impervious thermoplastic polymer with another layer such as a polyolefin, a rubber or another polymer which is impervious to water. In fact, EVOH or polymers containing EVOH can be sensitive to water and can partially lose their properties of imperviousness in the presence of water.

The thickness of the layer of impervious thermoplastic polymer may be between 50 and 1000 $\mu$m and that of the optional layer of binder between 5 and 300 $\mu$m.

Examples of binders which may be mentioned are:

polyethylene, polypropylene, copolymers of ethylene and of at least one alpha-olefin and mixtures of these polymers. All these polymers are grafted with anhydrides of unsaturated carboxylic acids, such as maleic anhydride, or unsaturated epoxides such as glycidyl methacrylate. It is also possible to employ mixtures of these graft polymers and of ungrafted polymers;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated epoxides; the monomers (I) to (iv) being grafted or copolymerized.

Particularly advantageous binders are:

polyethylene, polypropylene or copolymers of ethylene and of at least one alpha-olefin which are grafted with maleic anhydride and optionally mixed with other ethylene or propylene copolymers;

copolymers of ethylene and of alkyl(s) (meth)acrylate(s) or vinyl acetate which are grafted or copolymerized with maleic anhydride or glycidyl (meth)acrylate, optionally mixed with polyethylene or ethylene copolymers;

copolymers of ethylene and of (meth)acrylic acid partially neutralized with metals.

Where PVDF is involved as the impervious thermoplastic polymer, and if a very high adhesion is desired, that is to say that the separation of the PVDF from the polyolefin cannot be produced by peeling but only by rupture of the PVDF, it is recommended to employ a binder based on a mixture of polyalkyl methacrylate, elastomer and PVDF. This binder is described in U.S. Pat. Nos. 4,317,860 and 5,242,976.

In the case of PDVF it is also possible to employ the binders described in Patent Application No. FR 94-15052, the content of which is incorporated in the present invention. These are mixtures of aliphatic polyester, preferably polycaprolactone, and of a halogenated, preferably. chlorinated, polyolefin.

At least one product chosen from the following may also be grafted onto the aliphatic polyester:

unsaturated carboxylic acids, their salts, their esters and their anhydrides; for example maleic anhydride;

unsaturated products carrying epoxide functional groups, for example glycidyl (meth)acrylate;

vinyl esters, for example vinyl acetate;

styrene and its derivatives.

The quantity of grafted monomer is generally lower than 15% by weight of the ungrafted aliphatic polyester.

Chlorinated polyethylene (PE) and chlorinated polypropylene (PP) may be mentioned among the halogenated polyolefins, and especially those in which the chlorine content is between 10 and 50% by weight.

According to a particular form of the invention the main layer of polyolefin and/or the layer of impervious thermoplastic polymer contain a product which permits their adhesion without having to employ a layer of binder. This product may be the binder described above. This product is advantageously put only into the polyolefin layer.

Among the impervious thermoplastic polymers preference is given to polyamides, copolyamides or their mixtures with polyolefins.

Polyamide is intended to mean the products of condensation:

of one or more amino acids, such as aminocaproic, 7-aminoheptanoic, 11-aminoundecanoic and 12-aminododecanoic acids and of one or more lactams such as caprolactam, oenantholactam and lauryllactam;

of one or more salts or mixtures of diamines such as hexamethylenediamine, dodecamethylenediamine, meta-xylylenediamine, bis-p-aminocyclohexylmethane and trimethylhexamethylenediamine with diacids such as isophthalic, terephthalic, adipic, azelaic, suberic, sebacic and dodecanedicarboxylic acids;

or of mixtures of all these monomers, which results in copolyamides.

Polyamide mixtures may be employed. PA-6, PA-11 and PA-12 and amorphous polyamides are advantageously employed.

PA-11 and PA-12 are preferred because of their melting temperature which is lower than that of PA-6 and by virtue of which they are easier to coextrude with a binder and a polyolefin.

As for the mixtures of polyamides and polyolefins, it is advantageous that these mixtures should be based on a polyamide matrix. As for the polyolefins dispersed in this polyamide matrix, these are polymers including olefin units such as, for example, ethylene, propylene, 1-butene and similar units.

Examples which may be mentioned are:

polyethylene, polypropylene and copolymers of ethylene with alpha-olefins. These products may be grafted with anhydrides of unsaturated carboxylic acids, such as maleic anhydride or unsaturated epoxides such as glycidyl methacrylate;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half esters and their anhydrides and (iv) unsaturated epoxides, it being possible for the units (i) to (iv) to be grafted or copolymerized;

styrene/ethylene-butene/styrene (SEBS) block copolymers, optionally maleinized.

Mixtures of two or more of these polyolefins may be employed.

The following are advantageously employed:

polyethylene, copolymer:s of ethylene and of an alpha-olefin, copolymers of ethylene/of alkyl(s) (meth)acrylate(s), copolymers of ethylene/of alkyl(s) (meth)acrylate(s)/of maleic anhydride, the maleic anhydride being grafted or copolymerized, copolymers of ethylene/of alkyl(s) (meth)acrylate(s)/of glycidyl methacrylate, the glycidyl methacrylate being grafted or copolymerized, polypropylene.

To facilitate the formation of the polyamide matrix, and if the polyolefins have few or no functional groups that can facilitate the compatibilization, it is recommended to add a compatibilizing agent.

The compatibilizing agent is a product known per se for compatibilizing polyamides and polyolefins.

The following may be mentioned, for example:

optionally neutralized ethylene/(meth)acrylic acid copolymers;

polyethylene, polypropylene, ethylene propylene copolymers and copolymers of ethylene and of an alpha-olefin, all these products being grafted with maleic anhydride or glycidyl methacrylate, ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, the two preceding copolymers, in which the maleic anhydride is replaced with glycidyl methacrylate, polyethylene, with polypropylene or ethylene propylene copolymers, these polymers being grafted with a product exhibiting a site which is reactive with amines; these graft copolymers being subsequently condensed with polyamides or polyamide oligomers which have only one amine end.

These products are described in Patents FR 2 291 225 (U.S. Pat. Nos. 3,972,961; 3,976,720) and EP 342 066 (U.S. Pat. No. 5,342,886), the contents of which are incorporated by reference in the present application.

The quantity of polyamide forming the matrix may be between 55 and 95 parts per 5 to 45 parts of polyolefins.

The quantity of compatibilizing agent is the quantity which is sufficient for the polyolefin to be dispersed in the form of nodules in the polyamide matrix. It may represent up to 20% by weight of the polyolefin. These polymers of the internal layer are manufactured by mixing polyamide, polyolefin and optionally compatibilizing agent according to the usual techniques.

In the case of polypropylene, a compatibilizing agent is added which is advantageously an ethylene/propylene copolymer predominating in the number of propylene units, grafted with maleic anhydride and then optionally subsequently condensed with monoamine caprolactam oligomers.

Such mixtures of polyamide and of polypropylene are described in U.S. Pat. No. 5,342,886.

These polyamides or their mixtures with polyolefins may also contain fillers such as carbon black, antioxidants and the like.

It would not constitute a departure from the scope of the invention to employ, as impervious thermoplastic polymer, mixtures of polyamide and of polyolefins with a polyolefin matrix. The polyamides and the polyolefins are chosen from the above products.

The permeability to hydrocarbons is superior to that of the polyamides or of the polyamide matrices, but it may be sufficient. One advantage of this form of the invention is that the adhesiveness between this layer and the main layer is sufficient and may be produced without any binder. This advantage is employed in particular in the case of a main layer of polyethylene and an impervious layer with a polyethylene matrix.

We claim:

1. Pipes for conveying drinking water, comprised of a plurality of layers, wherein a main layer comprising a polyolefin is covered externally with a second layer comprising a thermoplastic polymer which is impervious to hydrocarbon, and wherein there is no layer of binder between the polyolefin layer and the thermoplastic layer.

2. Pipes according to claim 1, wherein the thermoplastic polymer which is impervious to hydrocarbons is selected from the group consisting of polyvinylidene fluoride, copolymers of ethylene and of vinyl alcohol, polyesters, polyamides and mixtures of polyamides with polyolefins.

3. Pipes according to claim 1, wherein the main layer comprises polyethylene and the second layer which is impervious to hydrocarbons comprises polyamide.

4. Pipes according to claim 2, wherein the main layer comprises polyethylene and the second layer which is impervious to hydrocarbons comprises polyamide.

5. A pipe for conveying drinking water, comprised of a plurality of layers, wherein the inner layer comprises a polyolefin and wherein there is an outer layer of thermoplastic polymer impervious to hydrocarbons comprising PVDF, and wherein the polyolefin layer and the outer layer comprising PVDF are bound with a mixture comprising polyalkyl methacrylate, elastomer, and PVDF.

* * * * *

UNITED STATES PATENT AND TRADEMARK OFFICE
CERTIFICATE OF CORRECTION

PATENT NO. : 6,511,724 B1
DATED : January 28, 2003
INVENTOR(S) : Siour et al.

It is certified that error appears in the above-identified patent and that said Letters Patent is hereby corrected as shown below:

Column 1,
Line 16, delete "hydrocarbon" and insert -- hydrocarbons --.

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,511,724 B1  Page 1 of 1
DATED : January 28, 2003
INVENTOR(S) : Siour et al.

It is certified that error appears in the above-identified patent and that said Letters Patent is hereby corrected as shown below:

<u>Column 5,</u>
Line 16, delete "hydrocarbon" and insert -- hydrocarbons --.

This certificate supersedes Certificate of Correction issued July 13, 2004.

Signed and Sealed this

Fourteenth Day of September, 2004

JON W. DUDAS
*Director of the United States Patent and Trademark Office*